United States Patent [19]

Schiaretti et al.

[11] Patent Number: 5,280,830
[45] Date of Patent: Jan. 25, 1994

[54] APPARATUS FOR TRANSPORTING PRODUCTS, PARTICULARLY PACKAGED FOOD PRODUCTS, FROM A PRODUCT LOADING STATION TO A PRODUCT UNLOADING STATION

[75] Inventors: Enrico Schiaretti; Enzo Fontanesi, Rico'; Paolo Gabelli, Varano Melegari; Antonio Chierici, Parma, all of Italy

[73] Assignee: Barilla G.e. R. F.lli - Societa per Azioni, Parma, Italy

[21] Appl. No.: 868,735

[22] Filed: Apr. 15, 1992

[30] Foreign Application Priority Data

Sep. 10, 1991 [IT] Italy .................. MI91 A 002387

[51] Int. Cl.$^5$ ............................................. B65G 47/04
[52] U.S. Cl. ................................ 198/465.3; 198/792; 198/795
[58] Field of Search ............... 198/343.2, 465.1, 465.3, 198/792, 795

[56] References Cited

U.S. PATENT DOCUMENTS

| | | | |
|---|---|---|---|
| 3,070,838 | 1/1963 | Hostettler | 198/792 X |
| 3,661,243 | 5/1972 | Piatek | 198/792 X |
| 3,858,519 | 1/1975 | Masino et al. | 198/795 X |
| 3,902,587 | 9/1975 | Checcucci | 198/465.1 X |
| 4,088,220 | 5/1978 | Jacksch et al. | 198/343.2 X |
| 4,162,723 | 7/1979 | Kupper | 198/795 X |
| 4,509,429 | 4/1985 | De Broqueville | 198/792 X |
| 4,776,453 | 10/1988 | Miller | 198/564.3 X |
| 4,896,763 | 1/1990 | Hordyk et al. | 198/465.3 X |

Primary Examiner—D. Glenn Dayoan
Attorney, Agent, or Firm—Sughrue, Mion, Zinn, Macpeak & Seas

[57] ABSTRACT

In an apparatus for transporting packaged food products from a product loading station to an unloading station, series of containers are entrained by a drive arrangement along a closed-loop path and temporarily halted at the loading station and the unloading station for loading the products onto the containers and unloading the products from the containers, respectively; each container has a hitch member arranged to rest on the drive arrangement in a freely slidable manner therealong and, disposed in the closed-loop path, there is at least one accelerating device applying a force to each container effective to impose on the container an acceleration with respect to the speed of the drive arrangement.

10 Claims, 4 Drawing Sheets

APPARATUS FOR TRANSPORTING PRODUCTS, PARTICULARLY PACKAGED FOOD PRODUCTS, FROM A PRODUCT LOADING STATION TO A PRODUCT UNLOADING STATION

BACKGROUND OF THE INVENTION

This invention relates to an apparatus for transporting food products, from a station whereto they are delivered one after the other, to a second station whence at least two of said products are simultaneously picked up and passed over to subsequent processing.

It is known that in a process for packaging food products which have peculiar features of texture, shape, and dimensions—as may have certain confectionary products, bakery products, and the like—a fairly common practice is to first package each product individually, and then pack (or box) the individually packaged products in predetermined numbers, for example within a common box or such like container.

Packaging lines for products as above are, therefore, equipped with two packaging machines which have, of necessity, different constructional and performance characteristics and which, above all, operate at different rates: the machine which packages the individual products being the faster of the two, and the machine which boxes the predetermined numbers of individually packaged products being the slower.

For creating no discontinuities in the production line (storage or lack of products at some key points along the line), as well as to ensure an at least acceptable productivity from the industrial standpoint, the operational times and rates of the two packaging machines, the slow one and the fast one, must be disjoined and made independent of each other.

For this purpose, an apparatus has long been in use for transporting individually packaged food products from the fast packaging machine to the slow one, which apparatus comprises a continuous belt entraining a series of substantially tray-like containers along a closed loop path. The containers are halted at a first station where they are each loaded with a single packaged product and then halted at a second station to form groups of a predetermined number of said containers whence the respective packaged products are simultaneously picked up and taken to the slow packaging machine. Throughout this specification and the appended claims, said first station will be referred to as the load station for loading individually packaged products and the second station as the unload station for simultaneously unloading a predetermined number of such products.

Each container is provided with a hitch mechanism that clasps elastically the belt, whereby it is entrained in frictional engagement with the latter. At the load and unload stations, the container is halted by check devices which hold up the container against said frictional engagement, while the belt continues to run in order to move non-halted containers located in areas other than the load and unload stations.

It is a recognized fact that the adjustment of the friction force to enable proper operation of the transport apparatus constitutes a problem. In fact, a sufficiently large friction force is required to prevent relative slip between the hitch mechanism and the belt while the belt is dragging the container with it, so as to avoid losses of speed by the container; on the other hand, the friction force should be sufficiently small not to strain the check devices and harm the belt when the container is held up at the load and unload stations. Any solution is, therefore, a compromise solution which fails to provide a highly efficient transport apparatus.

In addition, the friction force may change over time and require renewed setting of the transport apparatus.

SUMMARY OF THE INVENTION

It is object of the present invention to provide a transport apparatus which has none of the aforementioned drawbacks.

This object is achieved by an apparatus for transporting products, particularly packaged food products, from a load station to an unload station, comprising a drive arrangement travelling a closed loop path, a plurality of containers for the products, means of temporarily halting said containers at the load station and the unload station, characterized in that each container includes a hitch member arranged to rest on the drive arrangement in a freely slidable way therealong, and that at least between said stations, accelerating means active on each container are arranged to impose on successive ones of the containers an acceleration with respect to the speed of said drive arrangement.

BRIEF DESCRIPTION OF THE DRAWINGS

To make the features and advantages of this invention more clearly understood, an exemplary non-limitative embodiment thereof will now be described as it is illustrated by the accompanying drawings, in which.

DETAILED DESCRIPTION OF THE INVENTION

Figure 1:
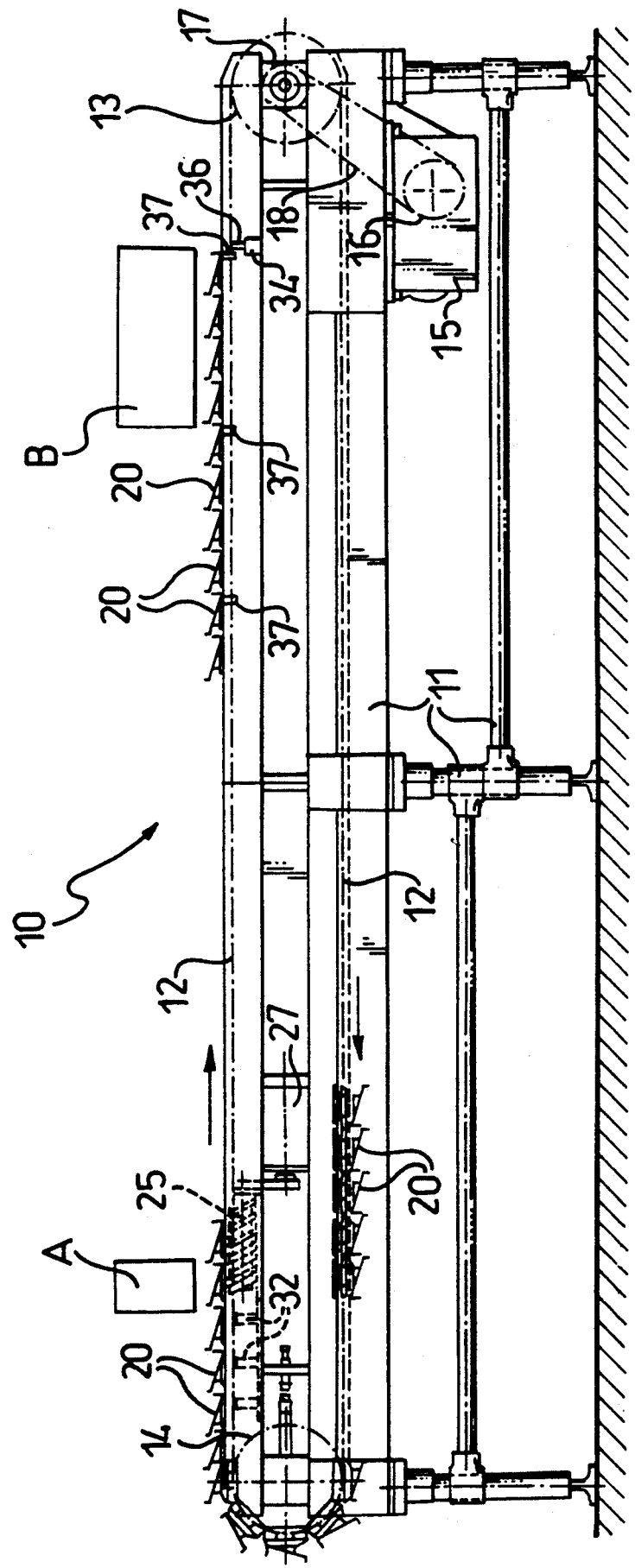
FIG. 1 is a general elevation view of a transport apparatus according to the invention.

The transport apparatus shown in FIG. 1 and generally indicated at 10 therein, is intended for transporting packaged food products from a load station, schematically represented by a block A, to an unload station, schematically represented by a block B.

The apparatus 10 comprises a frame structure 11 mounting a drive arrangement.

Figure 6:
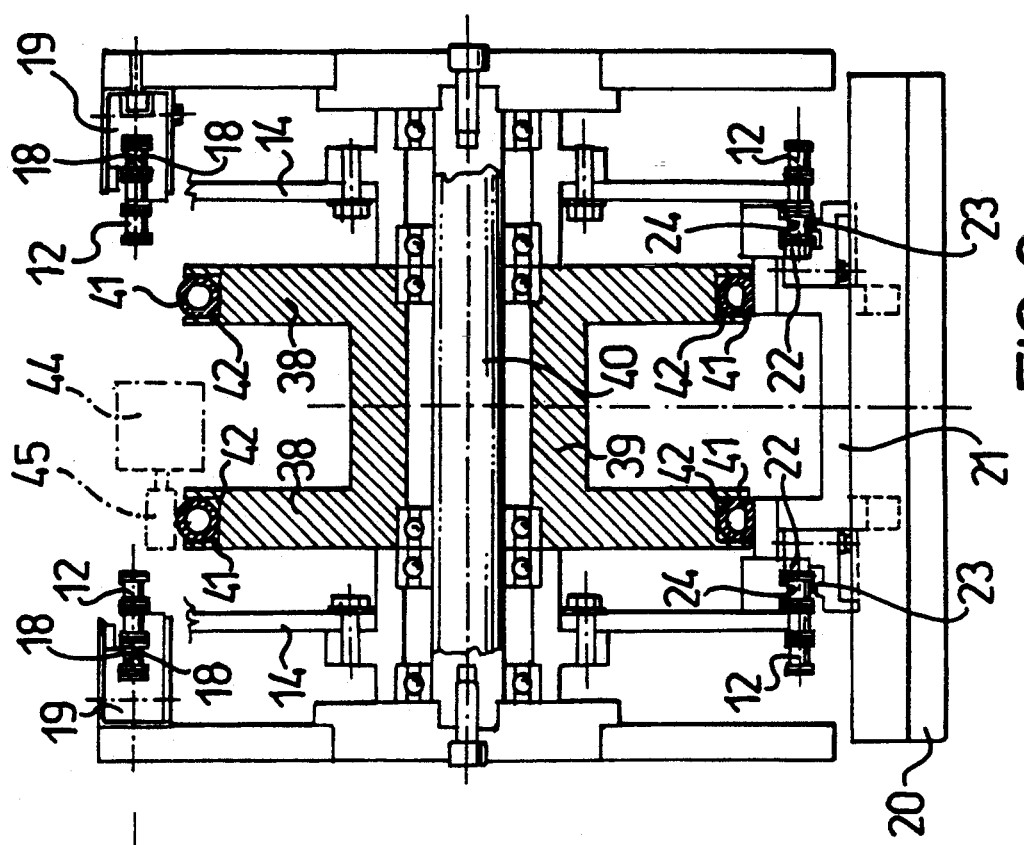
FIG. 6 is a sectional view taken along line VI—VI in FIG. 5.

This drive arrangement comprises two chains 12 which run across two parallel vertical planes. Each chain 12 has plural rows of links and is trained in a closed loop around two end sprocket wheels 13 and 14. The chains 12 are driven by a common electric motor 15, e.g. through a transmission including two pulleys 16, 17 and a cogged belt 18 interconnecting them, pulley 16 being rigid with the shaft of motor 15 and pulley 17 being rigid with the sprockets 13. As shown in FIG. 6, the chains 12 are guided along seats 18 on carrier structures 19 in the apparatus 10.

The chains 12 entrain along an endless path (correspondingly with the closed loop formed by the chain themselves) groups of containers 20 adapted to receive the packaged food product. This endless path is composed, as viewed in FIG. 1, of an upper straight "going"

run, a lower straight "return" run, a circular arc descending run at the locations of sprockets 13, and a circular arc ascending run at the locations of sprockets 14.

Figure 2:
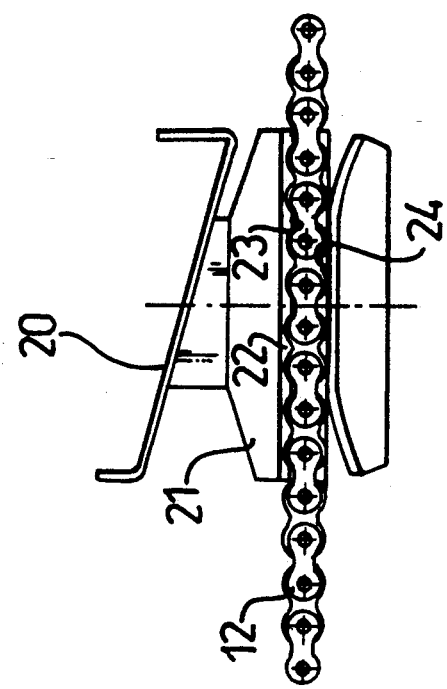
FIG. 2 is a detail view of the transport apparatus shown in FIG. 1.
Figure 3:
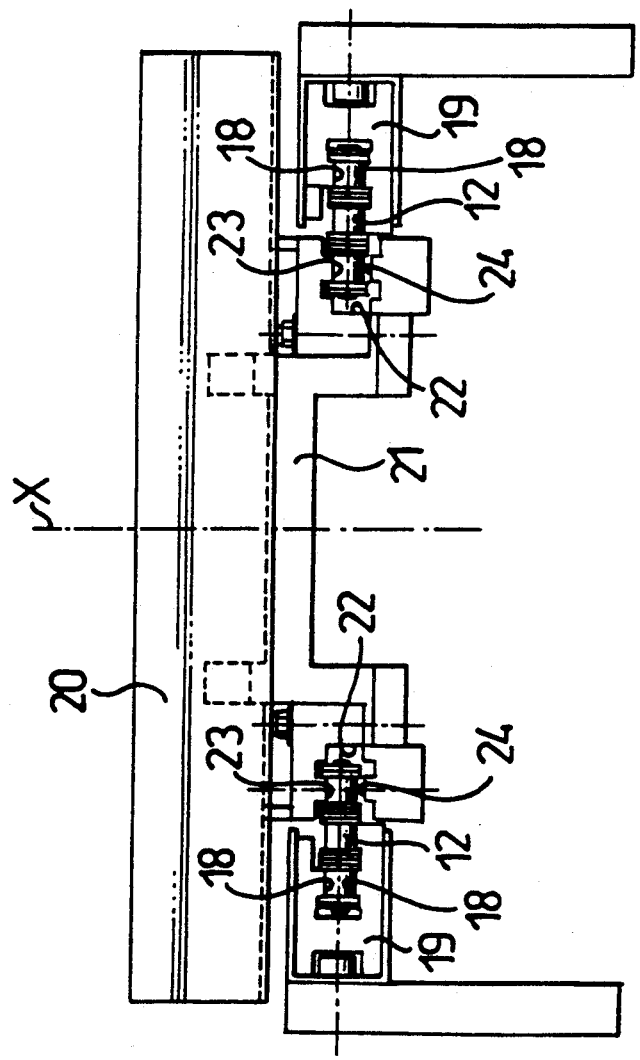
FIG. 3 is a front view of the detail shown in FIG. 2.

Each container 20 consists, in this embodiment, of a substantially U-shaped tray having an inclined base above the horizontal and being open at two opposed sides perpendicularly to the entrainment direction to allow of the product loading and unloading. Each container 20 is arranged to rest, in a freely slidable manner, on the chains 12; to this aim, and as shown in FIGS. 2, 3, each container 20 is provided with a hitch member 21 which has two, substantially C-shaped, longitudinal seats 22, each formed with two bearing walls provided by juxtaposed flanges 23, 24, as explained later in this specification. Each seat 22 receives, between said flanges 23 and 24, a respective chain 12; while the container 20 travels along said upper going run, the walls 23 of seats 22 rest on the chains 12, as shown in FIG. 3, whereas with the container 20 positioned in said lower return run, the walls 24 of seats 22 rest on the chains 12, as shown in FIG. 6. The walls 23, 24 of seats 22 have a tooth-like profile adapted to engage with a corresponding profile on the chains 12, as shown in FIGS. 3, 6, thereby inhibiting movements along a transverse direction to the running direction as the container 20 is being entrained by the chains 12.

Figure 4:
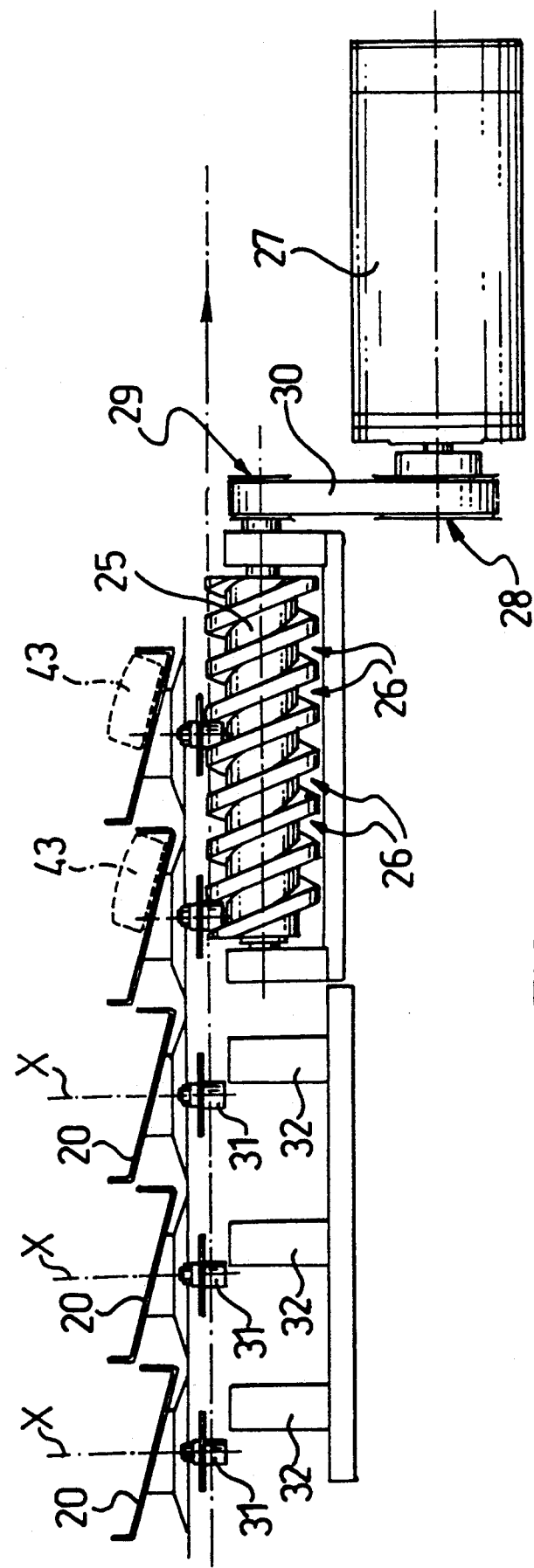
FIG. 4 is another detail view of the transport apparatus shown in FIG. 1.

At the load station A, where one container 20 at a time is loaded, this apparatus 10 is provided with accelerating means provided for the movement of the containers 20. With reference to FIGS. 1, 4, these accelerating means comprise a screw 25 extending along the running direction of the containers 20 and being formed with a helical groove 26. The screw 25 is set into rotation by an electric motor 27 via a transmission which includes two pulleys 28, 29 respectively rigid with the shaft of the motor 27 and the screw 25, and a belt 30 trained around the pulleys 28, 29. Each container 20 is provided with an engagement peg 31, attached along a center axis X thereof and adapted to engage in the groove 26 of screw 25, to accelerate the container in a manner to be explained.

Upstream of the screw 25 in the running direction of the containers 20 are a series of magnets 32 effective to attract the containers 20; for this purpose, each container 20 should be made, throughout or in part, of a ferromagnetic material; for instance, at least the engagement peg 31 would be made of a ferromagnetic material.

At the unload station B, where several containers 20 are unloaded simultaneously, the apparatus 10 is provided with an air-operated check device 34. This check device 34 includes a pin 36 which is driven pneumatically between extended and retracted positions. Each group of containers 20 to be unloaded simultaneously at the unload station (which group may comprise a single container, in the extreme) has a leading container provided with a detent 37 adapted to collide with the pin 36.

At the ascending run of the endless path travelled by the containers 20, that is at the sprocket wheels 14, a pusher means comprising two idle wheels is provided. Specifically, with reference to FIGS. 5, 6, these idle wheels, indicated at 38, are disposed between the sprockets 14 and made rigid with each other by being a unitary construction with a common hub 39; the hub 39 is mounted in a freely rotatable manner on the same shaft 40 which carries the sprockets 14. Each wheel 38 has an annular rim of an elastically yielding material consisting of a circular cross-section, hollow rubber ring 41 which is fitted into an annular groove 42 on the periphery of wheel 38.

The apparatus 10 described in the foregoing operates as follows, assuming a clockwise direction for the movement of the chains 12, as indicated by arrows in FIG. 1.

With reference to the straight upper going run, at the end of the circular arc ascending run, the magnets 32 pull the containers 20 toward the screw 25, accelerating them with respect to the speed of the chains 12. The containers 20 can travel at a higher speed than the chains 12 by the fact that they rest in a freely slidable manner, with the seats 22 of their hitch members 21, on the chains 12.

The first container 20 to reach the screw 25 will come to a halt against the screw upon its respective engagement pin 31 striking the walls of the helical groove 26. The screw 25 is held stationary to allow a packaged food product to be loaded onto said container 20. This packaged food product is shown schematically in dash-and-dot line at 43 in FIG. 4.

Once the product 43 is loaded onto the container 20, the screw 25 is set to rotate by the motor 27 so that the engagement peg 31 of the container 20 enters the helical groove 26 of the screw 25 and is entrained thereby to impart an accelerated straight-line movement to the container and almost throw the container 20 toward the unload station B at a higher speed than the travel speed of the chains 12. At this station B, the container 20 considered will be halted by the check device 34.

The above explanation applies to all of the containers 20 as they arrive in succession at the screw 25 which will operate intermittently by alternating pauses with rotations.

Thus, a queue of containers 20 forms at the unload station B and upstream thereof, as clearly visible in FIG. 1.

The check device 34 operates to halt, at the unload station B, a first group and the following ones of containers 20 loaded with the product 43. For this purpose, the pin 36 is driven into its extended position so that the detent 37 of the first container 20, i.e. the leading container 20 in the first group, strikes said pin 36 causing the leading container and all of the successive ones to come to a halt. In the embodiment shown, each group of containers includes four containers 20.

At this point, all the products in the first group of four containers 20 are simultaneously unloaded at said unload station B.

On completion of the unload operation, the pin 36 is retracted to release the leading one of said containers and, therefore, enable release of the whole group of containers.

After releasing the leading container in the group, the pin 36 is returned to its extended position, ready to engage the detent 37 of a leading container 20 in a second group of containers.

Once the product unloading operation on the second group of containers 20 is completed, the process is repeated as above.

The containers 20 are allowed to stop by the fact that they rest on the chains 12 in a freely slidable manner and that with the containers held up, the chains can run along the seats 22 in the hitch members 21 of the containers.

The containers 20, having moved past the check device 34, reach the circular arc descending run at sprocket 13. In this descending run, said containers 20 are accelerated by gravity force beyond the speed of chains 12 and will, accordingly, slide down the chains.

It should be noted that, as shown in FIG. 6, the seats 22 in the hitch members 21 of the containers 20 rest on rows of links of chains 12 different from the rows of links of chains 12 which engage with the sprocket wheels 13, 14.

On exiting the descending run, the containers 20 will move with the chains 12 all the way along the straight lower return run by just resting on the chains under their own weight. Of course, along this run, the containers would be upside down from their attitude along the straight upper going run.

Figure 5:
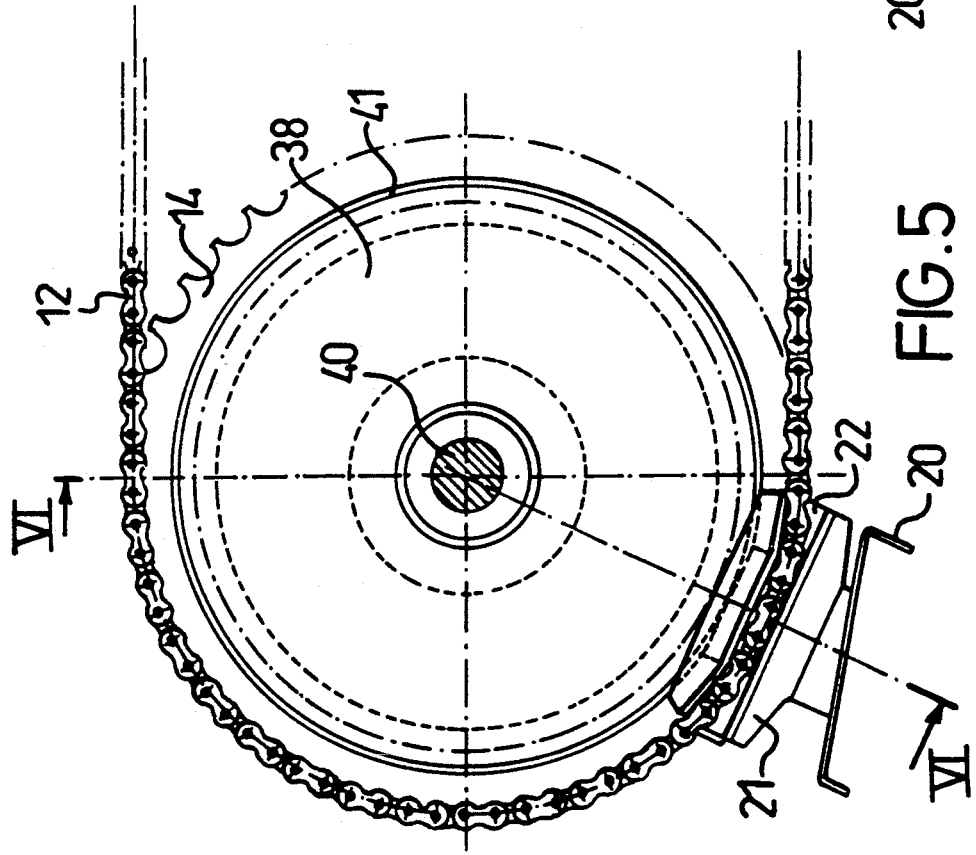
FIG. 5 shows a further detail of the transport apparatus in FIG. 1.

As the containers 20 arrive at the start of the circular arc ascending run, the rings 41 of wheels 38 press, for each container as shown in FIGS. 5, 6, the hitch member 21 of the container 20 against the chains 12 to develop a sufficient frictional force between the walls 24 of the seats 22 in the hitch member 21 and the chains 12 to enable the chains to drag the container upwards. In this upward movement, the idle wheels 38 are also caused to rotate by the frictional engagement of the hitch member 21 with the rings 41.

Once the containers 20 have moved past the ascending run and entered the straight going run, the above cycle is renewed.

A detailed description of the load station A and the unload station B has been omitted from the foregoing discussion because they are structurally and operationally well kown.

The transport apparatus 10 as described and illustrated has an advantage in that it requires no friction drive for moving the carts through the closed loop path, as it is required instead in the known transport apparatus mentioned in the introduction.

In fact, this apparatus 10 is based on a mere rest of the containers 20 on the chains 12 in a freely slidable manner, and on the use of accelerating means such as the power driven screw 25.

The drawbacks reviewed in the introduction with which that friction drive is beset, are absent from this apparatus 10.

The accelerating screw 25 additionally affords improved performance over the known friction drive apparatus, in that it enables much higher entrainment speeds of the drive arrangement (chains 12) between the load and unload stations. Thus, the containers will queue more readily at the unload station.

The magnets 32, by magnetically pulling the containers 20 toward the start of the screw 25, ensure that the engagement element 31 of the container 20 will positively enter the helical groove 26 of the screw 25.

What is claimed is:

1. An apparatus for transporting products from a load station to an unload station comprising mechanical driving means for moving a plurality of independent unconnected containers for the products along a closed loop path and stop means for temporarily halting said containers at the load station and the unload station, wherein each container includes a hitch member arranged to rest on said driving means in a freely slidable way for movement therealong and an engagement peg and accelerating means acting on each container for imposing on each successive container an acceleration with respect to the speed of said driving means, said accelerating means comprising at least one screw disposed along said closed path at said load station and formed with a helical groove for receiving said engagement peg of each container motor means for intermittently rotating said screw to allow products to be loaded into each container when the screw is stationary and upon rotation of the screw to impart an acceleration to each successive container to freely throw each container towards said unload station in a straight line motion along said driving means.

2. An apparatus according to claim 1, wherein upstream of said screw, magnets are arranged to apply to each container, made at least in part of a ferromagnetic material, a magnetic force effective to produce accelerated movement of the container toward the screw.

3. An apparatus according to claim 1, wherein said closed path includes an upper going run along which the load and unload stations are disposed, a lower return run, and two runs respectively descending toward the lower run and ascending toward the upper run, at the ascending run there being arranged pressure means effective to hold the hitch member of each container pressed against said driving means all the way along the ascending run to thereby enhance the frictional engagement of the hitch member with said driving means and enable the containers to be entrained upwards.

4. An apparatus according to claim 3, wherein the ascending run is a circular arc and the pressure means comprise one or more wheels whose annular rim applies said pressure to the hitch members of the containers.

5. An apparatus according to claim 4, wherein said wheels are idle wheels.

6. An apparatus according to claim 4, wherein said wheels are power driven wheels.

7. An apparatus according to claim 4, wherein said rim is an elastically yielding rim.

8. An apparatus according to either claim 4, wherein said rim is formed from a friction material.

9. An apparatus according to claim 3, wherein said drive arrangement comprises chains trained around sprocket wheels at said descending and ascending runs.

10. An apparatus according to claim 9, wherein the hitch member of each container comprises through-going longitudinal seats for receiving the chains therein, a first wall of each seat leaning on a corresponding one of the chains along the upper going run and a second wall, juxtaposed to said first wall, leaning on the chain along the lower return run thereof.

* * * * *